United States Patent [19]
Hunter

[11] Patent Number: 5,865,277
[45] Date of Patent: Feb. 2, 1999

[54] WHEELS AND BRAKES FOR VEHICLES

[76] Inventor: Marc Hunter, Site 257 C-5, Port Alberni, British Columbia, Canada, V9Y 7L6

[21] Appl. No.: 685,039

[22] Filed: Jul. 23, 1996

[51] Int. Cl.$^6$ .................................................... F16D 51/00
[52] U.S. Cl. ............................ 188/78; 188/17; 188/18 R; 188/218 R; 301/6.7; 192/107 T
[58] Field of Search .............................. 188/78, 325, 326, 188/331, 352, 76, 73.22, 17, 18 R, 218 R, 250 A, 257, 362, 258; 301/6.7; 192/107 T; 60/584

[56] References Cited

U.S. PATENT DOCUMENTS

| | | |
|---|---|---|
| 1,951,363 | 3/1934 | Kopf . |
| 1,969,775 | 8/1934 | Bragg . |
| 1,990,890 | 2/1935 | Barber . |
| 2,016,435 | 10/1935 | Isidin ........................................ 301/6.7 |
| 2,022,174 | 11/1935 | Allee . |
| 2,113,608 | 4/1938 | Waller . |
| 2,128,013 | 8/1938 | Parnell . |
| 3,404,756 | 10/1968 | Swift . |
| 3,478,844 | 11/1969 | Beuchle . |
| 3,482,654 | 12/1969 | Abu-akeel . |
| 3,586,132 | 6/1971 | Tantlinger . |
| 3,630,320 | 12/1971 | Lochmann . |
| 3,756,352 | 9/1973 | Urban . |
| 3,788,429 | 1/1974 | Brooks et al. . |
| 3,938,628 | 2/1976 | Figueroa . |
| 3,989,305 | 11/1976 | Umeda et al. ....................... 188/218 R |
| 4,181,145 | 1/1980 | Mitchell . |
| 4,429,767 | 2/1984 | Jenkins . |
| 4,724,934 | 2/1988 | Howell . |
| 4,776,641 | 10/1988 | Bulling . |
| 4,785,918 | 11/1988 | Biamino . |
| 4,799,575 | 1/1989 | Kroniger . |
| 4,921,077 | 5/1990 | Klimt . |
| 5,103,942 | 4/1992 | Schmitt . |

FOREIGN PATENT DOCUMENTS

| | | |
|---|---|---|
| 392065 | 10/1940 | Canada . |
| 1150648 | 7/1983 | Canada . |
| 1306203 | 8/1992 | Canada . |
| 725447 | 1/1943 | Germany . |
| 403282026 | 12/1991 | Japan ..................................... 188/258 |
| 860572 | 2/1961 | United Kingdom .................. 188/352 |
| 896543 | 5/1962 | United Kingdom . |

Primary Examiner—Robert J. Oberleitner
Assistant Examiner—Pamela J. Lipka
Attorney, Agent, or Firm—Martin J. Marcus

[57] ABSTRACT

A braking system for an automotive vehicle is provided which comprises, in combination, a wheel having a specifically-defined wheel rim for mounting a tire thereon, and a specifically-defined disc carrying the wheel rim for mounting the wheel upon a wheel support of the automotive vehicle. A cylindrical support is secured to the wheel. Radially-inwardly facing arcuate brake lining structures are secured to the cylindrical support. Brake shoes are mounted upon a non-rotatable part of the automotive vehicle in spaced positions around the rotational axis of the wheel support. A pressurized-fluid operating system of a specifically-defined structure is provided for moving the brake shoes in a braking action radially-outwardly from inactive positions towards, and frictionally-engaging, the brake lining structures, and for returning the brake shoes radially-inwardly to the inactive positions upon termination of said braking action. Primary additional structure is also provided for effecting movement of the brake shoes to further inactive positions by drawing pressurized-fluid from the braking system.

15 Claims, 6 Drawing Sheets

WHEELS AND BRAKES FOR VEHICLES

BACKGROUND OF THE INVENTION (i.) Field of the Invention

This invention relates to wheels and brakes for vehicles. In one embodiment, it is particularly concerned with wheels and braking systems for use on racing cars.

(ii) Description of the Prior Art

In wheel and brake assemblies for automotive vehicles, the brakes are either of the known disc brake type or of the known brake shoe type. In the brake shoe type, brake shoes have brake linings securely mounted thereon. The brake shoes are moveable, by various types of mechanical and/or fluid operated means, upon braking actions in which the shoes are caused to approach inner cylindrical surfaces of brake drums of the wheels, pressurized engagement of the brake linings with these brake drum surfaces effecting the braking action. Braking systems are undoubtedly extremely efficient in their action and have been, and are, used extensively throughout the automotive vehicle industry. In fact, every road vehicle appears to use either the brake shoe type of brake or the disc brake type. Further, both of these types of mechanism are shown extensively throughout the world in patent specifications and in magazine or other publications.

An inordinate amount of repair time is necessary for the purpose of replacing brake linings. This is particularly the case when replacing brake linings as the brake shoes themselves need to be removed and this may be an extremely intricate operation. The time taken for repair may not, under normal circumstances, be particularly important. In contrast, however, if the brake lining replacement were to be done upon a racing car during a pit stop in a racing car event, the time expended would be extremely important and may be crucial to the outcome of the race. While racing cars are subject to rigorous and high mechanical stresses during racing, which includes rapid brake lining wear inevitably leading to pit stops during a race, any time spent on a pit stop for any form of maintenance or repair of brakes may be considered as wasted time in the race. For this reason, pit stop time for brake lining replacement generally is not done, even though there may be loss in braking efficiency which could lead to accidents if no such replacement is undertaken.

SUMMARY OF THE INVENTION (i) Aims of the Invention

The present invention seeks to provide wheel and brake structures in which the above problems are minimised or are avoided completely.

(ii) Statements of Invention

According to the present invention, a wheel is provided comprising: a wheel rim for mounting a tire thereon; means carrying the wheel rim and extending radially-inwards from the rim towards a rotational axis of the wheel for mounting the wheel upon a driven or free-wheeling rotatable wheel support of a vehicle; support means which are disposed radially-inwardly of the wheel rim; and a radially-inwardly facing brake lining structure of constant radius supported on the support means, the brake lining structure extending at least partially around, and having a center of radius coincident with, the rotational axis of the wheel.

The invention also includes a wheel assembly comprising in combination: A) a wheel comprising: a wheel rim for mounting a tire thereon; mounting means carrying the wheel rim and extending radially-inwards from the wheel rim for mounting the wheel along a rotational axis; support means which are disposed radially-inwards of the wheel rim; and radially-inwardly facing brake lining structure of constant radius supported on the support means, the brake lining structure extending at least partially around, and having a center of radius coincident with, the rotational axis of the wheel and B) a driven or free-wheeling wheel support secured to a non-rotational part of the vehicle; a plurality of brake shoes having radially-opposed outer curved surfaces which are mounted upon the non-rotatable part of the vehicle in spaced positions around a rotational axis of the wheel support; and means for moving the brake shoes radially-outwards from inactive positions towards the brake lining structure, and for returning the brake shoes radially-inwards upon termination of the braking action; whereby on braking action the radially-opposing outer curved surfaces of the brake shoes are moved towards, and fractionally engage, the radially-inwardly facing brake lining structure.

(iii) Other Features of the Invention

By one feature of the wheel of this invention, the support means comprises a radially-inwardly facing surface extending substantially continuously around the rotational axis of the wheel. By a specific feature thereof, the brake lining structure is rigidly secured to the radially-inwardly facing surface.

By another feature of the wheel of this invention, the wheel includes a surrounding brake lining carrier, and the brake lining structure is detachably secured to the brake lining carrier radially-inwards of the support means, with the brake lining structure facing radially-inwards towards the rotational axis of the wheel. By a specific feature thereof, the support means comprises: a radially-inwardly directed support surface to which the brake lining assembly is secured; the brake lining carrier has an outer circumferential surface which is complementary to the support surface; and the wheel includes securing means for securing the support surface and the circumferential surface of the carrier in engagement with one another. By yet a further specific feature thereof, the securing means comprises a plurality of screw elements which are spaced apart angularly around the rotational axis of the wheel and which extend radially through respective aligned holes in the carrier and in the support means. By still another specific feature thereof, the support surface and the circumferential surface are both cylindrical.

By a further feature of the wheel of this invention the support means comprises a cylindrical element which is spaced radially-inwards of, and which is concentric with, the wheel rim; and the wheel includes means for dissipation of heat generated by braking action against the brake lining. By one specific feature thereof, the heat dissipating means comprises heat removal fins, preferably of spiral configuration, extending from the support means towards the wheel rim. By another specific feature thereof, the heat dissipating means includes an annular chamber having apertures communicating between front faces and rear faces thereof.

As may be seen, the wheel defined above according to the present invention is provided with its own brake lining structure. Thus, the wheel, upon removal from the vehicle may be replaced immediately with another wheel also having its own brake lining structure which serves as a replacement for the brake lining structure carried upon the previously used wheel. It follows, therefore, that wheel replacement for any purpose, including that of providing a new tire upon the vehicle, is automatically accompanied by a replacement brake lining structure. The addition of the brake lining structure in this manner requires no additional time as it is effected simultaneously with the wheel and tire replacement. Hence, in certain situations, e.g., in racing car events, where tires and wheels are replaced during the course of a race, a racing car may be equipped throughout the whole of a race with adequate braking facility without increasing the amount of pit stop time required during the race.

In the wheel defined above according to the present invention, the brake lining structure may be applied directly to the support means of the wheel. This support means may comprise an inwardly facing cylindrical surface to which the lining structure is directly mounted. Alternatively, the wheel may have a support means for securing a brake lining assembly thereto, the brake lining assembly comprising the brake lining structure which is secured to a surrounding brake lining carrier. The brake lining assembly is then mounted upon the wheel by co-operation between the brake lining carrier and the support means. In this arrangement, the carrier is detachably secured in position with the brake lining structure facing radially-inwards towards the rotational axis of the wheel.

In a preferred arrangement, the support means and the brake lining assembly have complementary cylindrical surfaces which engage each other when the brake lining assembly is assembled to the support surface. While the support surface is preferably cylindrical, it is also to be preferred that the support means itself be a cylindrical element which is spaced inwardly of the wheel rim and is concentric therewith. With this arrangement, the support means which must become heated during constant brake application, e.g., during a racing event, necessarily requires means to remove this heat which has been described hereinabove.

By one feature of the combination of this invention, the brake shoes are a diametrically opposed pair of shoes, with each end of each the shoe being operably connected to a fluid operated cylinder mechanism for moving the brake shoe on a braking action, and the return means comprises at least one tension spring. By one specific feature thereof, the means for moving the brake shoes on a braking action comprises: means for applying fluid pressure to move the brake shoes on the braking action and means for relaxing the fluid pressure upon termination of the braking action.

By another feature of the combination of this invention, the combination includes means for effecting movement of the brake shoes to further positions which are further radially-inwards of their inactive positions. By one specific feature thereof, the means for effecting movement of the brake shoes to the further positions which are radially-inwards comprises means for drawing pressurized fluid from the braking system.

By another feature of the combination of this invention, the combination includes a master cylinder and a valve which is disposed between the master cylinder and the means for drawing pressurized fluid from the system so as to disconnect the pressurized fluid in the master cylinder from the remainder of the system during operation of the means for drawing the pressurized fluid from the braking system. By one specific feature thereof, the means for drawing pressurized fluid from the braking system comprises a piston and cylinder assembly having a piston within a cylinder, one end of the cylinder being connected to the braking system, so that movement of the piston in one direction within the cylinder draws pressurized fluid from the braking system into the cylinder. By another specific feature thereof, the valve is held in its normally open position by a torsion spring, and which is urged towards its closed position by a counterbalancing tension spring, the tension spring being operated by vertical movement of an operating rod coupled to the piston.

With the combination of wheel and wheel support according to the invention provided on a vehicle, the braking system is preferably a fluid operated system and the means for effecting movement of the brake shoes to the further positions which are further radially-inwards operates to draw pressurized fluid from the system. Hence, the resilient means is permitted to urge the brake shoes to their further inner positions. Thus, upon removal of a wheel, a greater distance is created between the inner peripheral surface of each wheel and the brake shoes, thereby decreasing the possibility of binding between the wheel and the brake shoes with resultant easing of wheel removal.

To ensure that the master cylinder of the braking system does not suffer damage as the pressurized fluid is drawn from the system, the valve previously described is preferably provided as a butterfly valve which is closed so as to separate the fluid within the master cylinder from the remainder of the system.

BRIEF DESCRIPTION OF THE DRAWINGS

One embodiment of the invention will now be described, by way of example, with reference to the accompanying drawings, in which.

Figure 1:
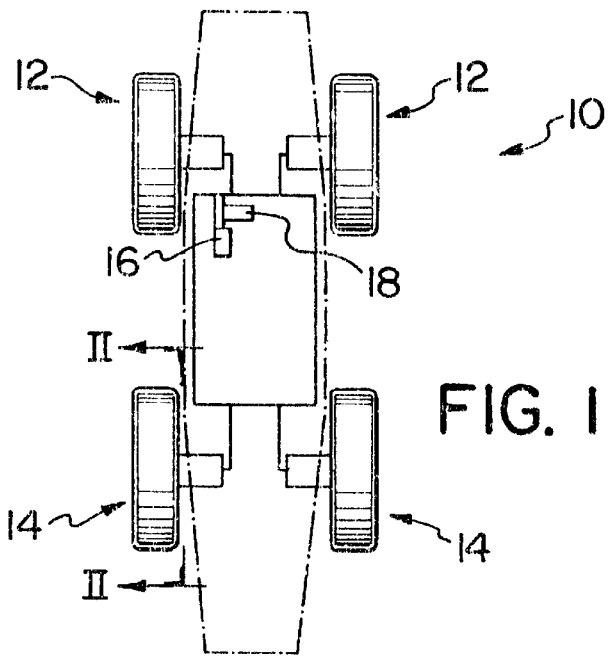
FIG. 1 is a diagrammatic plan view showing the basic layout of a braking system as used upon a vehicle.

DESCRIPTION OF PREFERRED EMBODIMENTS (i) Description of FIG. 1

As shown diagrammatically in FIG. 1, a car 10 shown in chain dotted, incorporates a wheel and braking assembly of this invention comprising front wheel assemblies 12 and rear wheel assemblies 14, (of which at least one assembly may be driven, and another assembly may be free-wheeling), a braking system controlled by a master cylinder 16 of conventional construction, and fluid pressurized lines 18 extending from the master cylinder 16 to each of the wheel assemblies 12, 14.

The construction of each of the driven wheel assemblies 14, which includes part of the invented braking system, is illustrated in FIGS. 2 to 7 inclusive.

Figure 2:
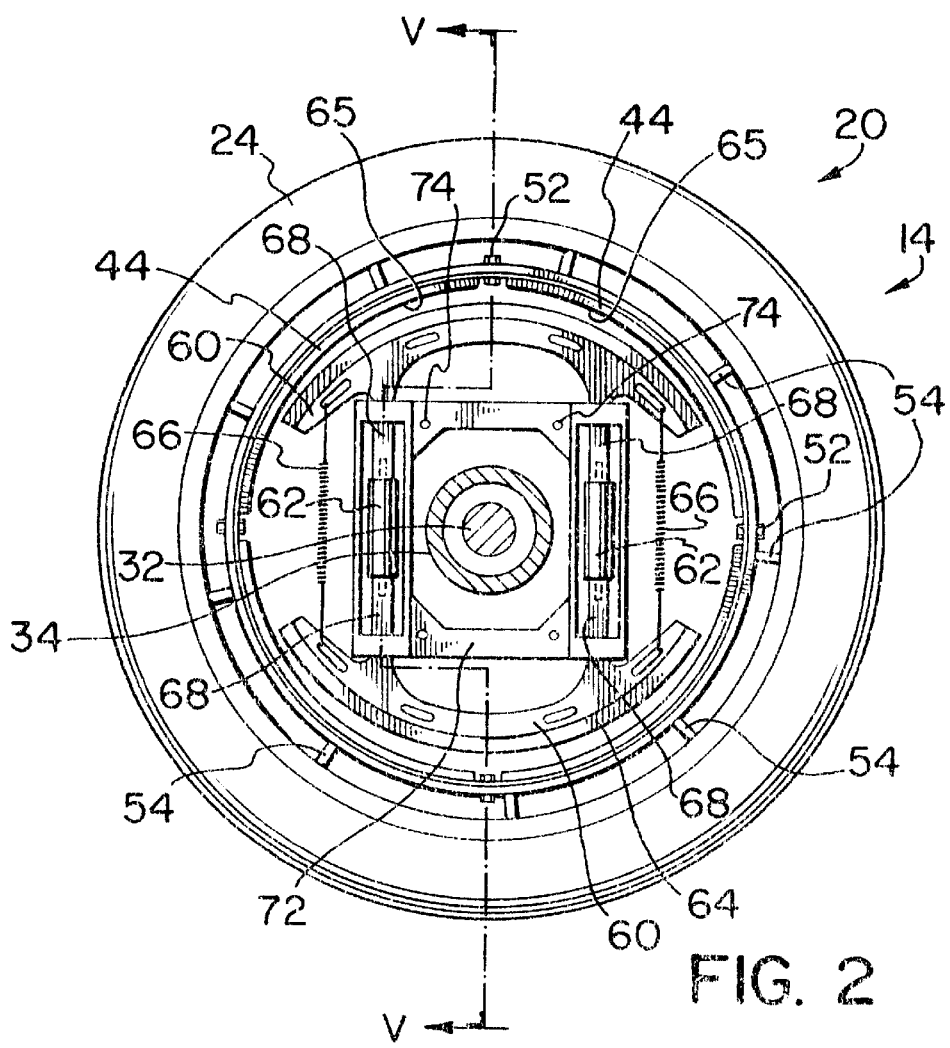
FIG. 2 is a side elevational view of the embodiment in the form of a wheel and brake lining assembly of the vehicle taken along line II—II in FIG. 1 and to a larger scale, parts of the wheel being removed for clarity.
Figure 3:
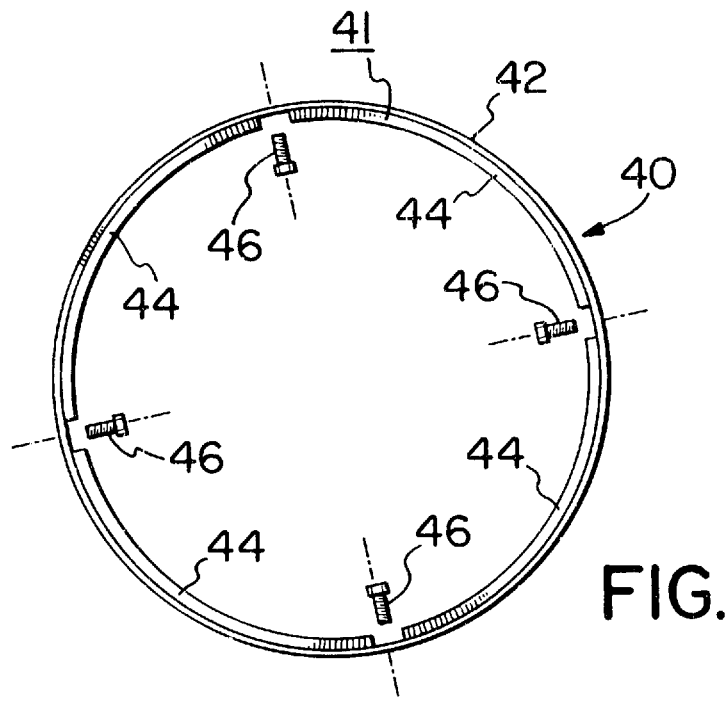
FIG. 3 is a multicross-sectional view of the wheel assembly of FIG. 2 taken along line III—III in FIG. 2.

(ii) Description of FIGS. 2 and 3

As shown in FIGS. 2 and 3, each rear wheel assembly comprises a wheel 20 comprising a wheel rim 22 upon which a pneumatic tire 24 is mounted in conventional fashion. The wheel has means for mounting the wheel rim concentrically with the rotational axis of the wheel, this means comprising an inwardly extending pressed wheel disc 26 (see FIG. 3). The wheel disc 26 is omitted from FIG. 2 and from other Figures similar to FIG. 2 for the purpose of showing other details. The wheel disc 26 is detachably secured by a plurality of retaining nuts and studs 28 to a back plate 30 which is secured to a driving half shaft 32 which is rotatably mounted in conventional fashion within a driven axle 34 of the vehicle. The wheel 20 differs from conventional wheels in that it is provided with part of the braking system, i.e., it has a brake lining structure forming an essential element of this invention mounted thereon, as will now be described.

In respect of each wheel assembly 12,14, and as shown particularly by FIGS. 2 and 3, two brake shoes 60 are provided. These brake shoes 60 are in diametrically opposite positions relative to the rotational axis of the wheel and are mounted so that each brake shoe 60 is operated simultaneously by two parallel fluid operated cylinders 62, which are also diametrically opposed across the rotational axis of the wheel. Each cylinder 62 has two opposite operational ends which operate one against each of the opposite shoes 60 so as to centralize the brake shoes 60 in operation. As shown in FIG. 2, each of the brake shoes 60 has an outer arcuate surface 64 which extends approximately 120 degrees around the rotational axis of the wheel. In the full outline inactive position of the brake shoes 60 shown in FIG. 2, the surfaces 64 are spaced from the inner peripheral surface 65 of the brake lining structure provided by the brake linings 44. In these positions, two tension springs 66 (see FIG. 2) mounted between opposing ends of the brake shoes 60 pull the brake shoes 60 radially-inwards so that two driving extensions 68 of each brake shoes 60, which engage plungers 70 of the cylinders 62 (see particularly FIG. 3) force the plungers 70 inwards against the pressure of the fluid in the braking system with the master cylinder inactivated.

The two cylinders 62 are securely mounted in their relative positions upon a backing plate 72 of open rectangular structure, the backing plate 72 being secured through holes 74 (see FIG. 2) by two screws to a mounting structure 76 (see FIG. 3) forming part of the non-rotatable portion of the wheel mounting structure, e.g., the non-rotatable portion of the axle 34. The mounting structure 76 is omitted from FIG. 2 and from similar Figures for the sake of clarity of other features. Each cylinder 62 is secured in position by spaced-apart nuts 78 (see FIG. 3) received upon studs which are securely mounted to the cylinders 62 and passing through bores which are suitably positioned in the backing plate 72. A fluid pressurized line 18 (see FIG. 1) extends to a substantially-mid-position of the respective cylinder 62 for simultaneously operating both of the plungers 70 and a bleed valve (not seen) which is suitably positioned upon each cylinder 62. Each cylinder 62 is provided with its own elongate rectangular open cover plate 82 as shown particularly in FIGS. 2 and 6. This cover plate 82 is secured at each end by two screws 84 to the backing plate 72 (see FIG. 6). Each cover plate 82 serves to hold an individual driving extension 68 of the brake shoe 60 in a location which is slideably mounted within a complementary shaped slot 86 in the backing plate 72, whereby the driving extension 68 is guided in its sliding movement during movement of the brake shoe 60.

The structure of a driving wheel assembly has been described in the embodiment. Such driving wheel may be a rear wheel assembly or it may be a front wheel assembly. Furthermore, both front and rear wheel assemblies may be driven, as in a four-wheel drive vehicle. The main features of the structure are similar for a non-driving wheel assembly, e.g., where the non-driving assembly is securely mounted upon a short free-wheeling rotatable mounting within a fixed wheel assembly structure as is conventional with vehicle constructions. The construction of the non-driving wheel assemblies is, therefore, not required to be described.

Figure 4:
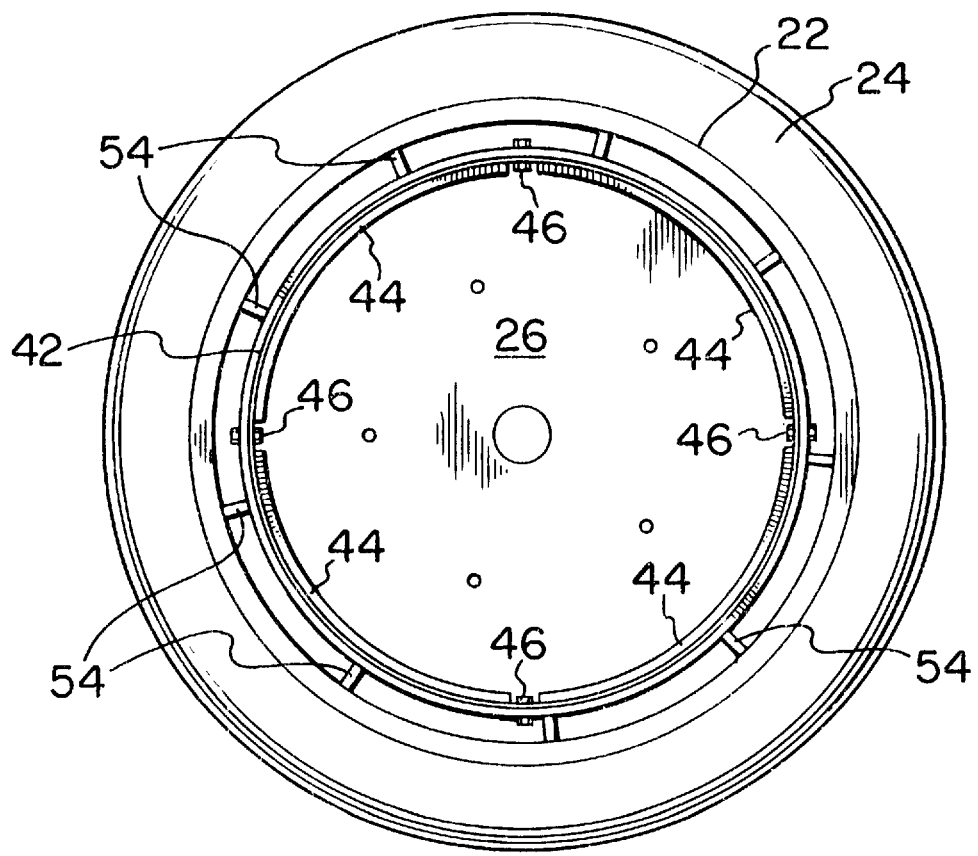
FIG. 4 is a view similar to FIG. 2 of the brake lining assembly.
Figure 5:
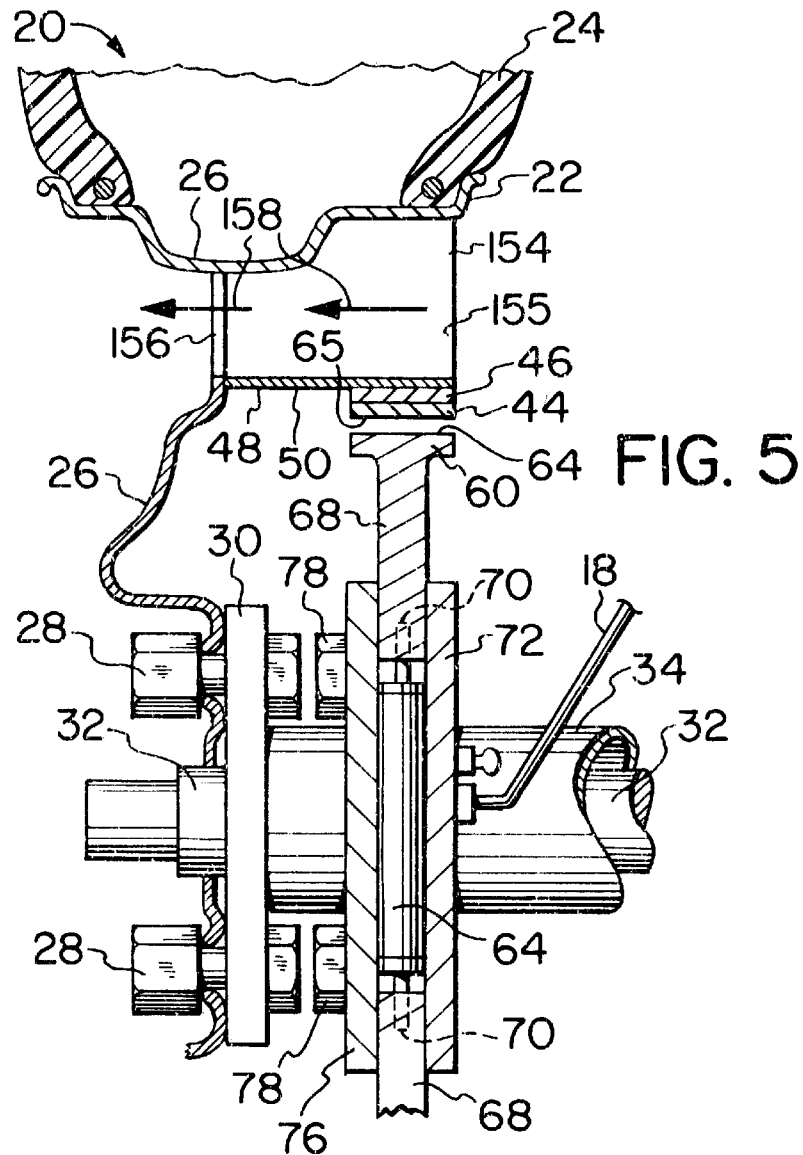
FIG. 5 is a view similar to FIG. 2 of the wheel.
Figure 6:
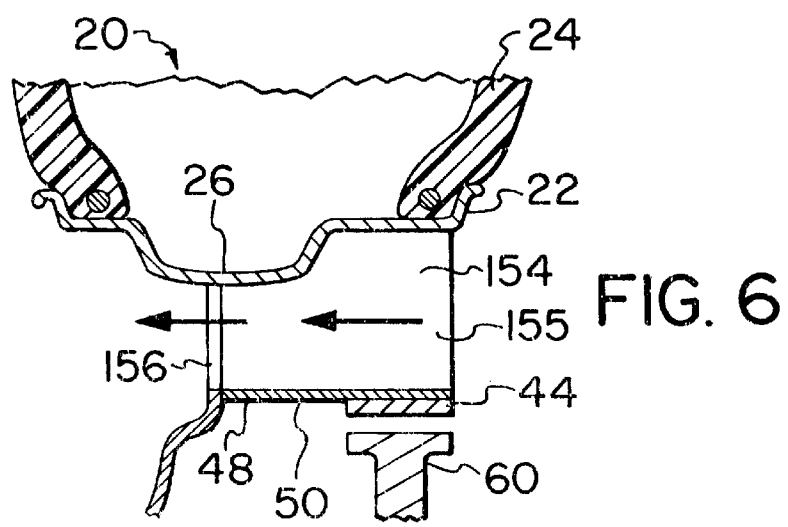
FIG. 6 is an isometric view at one corner position of part of the braking system.
Figure 7:
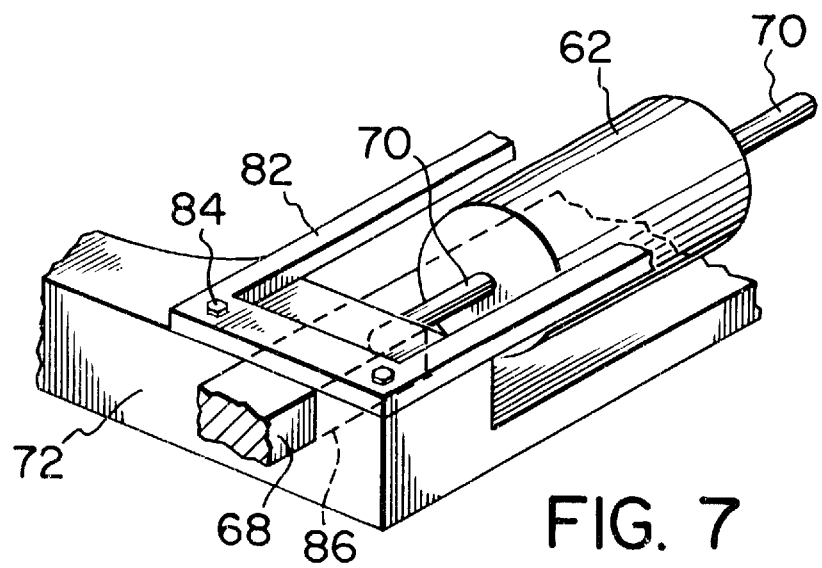
FIG. 7 is a view similar to FIG. 2 and showing the position of the elements of the assembly during a braking action.
Figure 11:
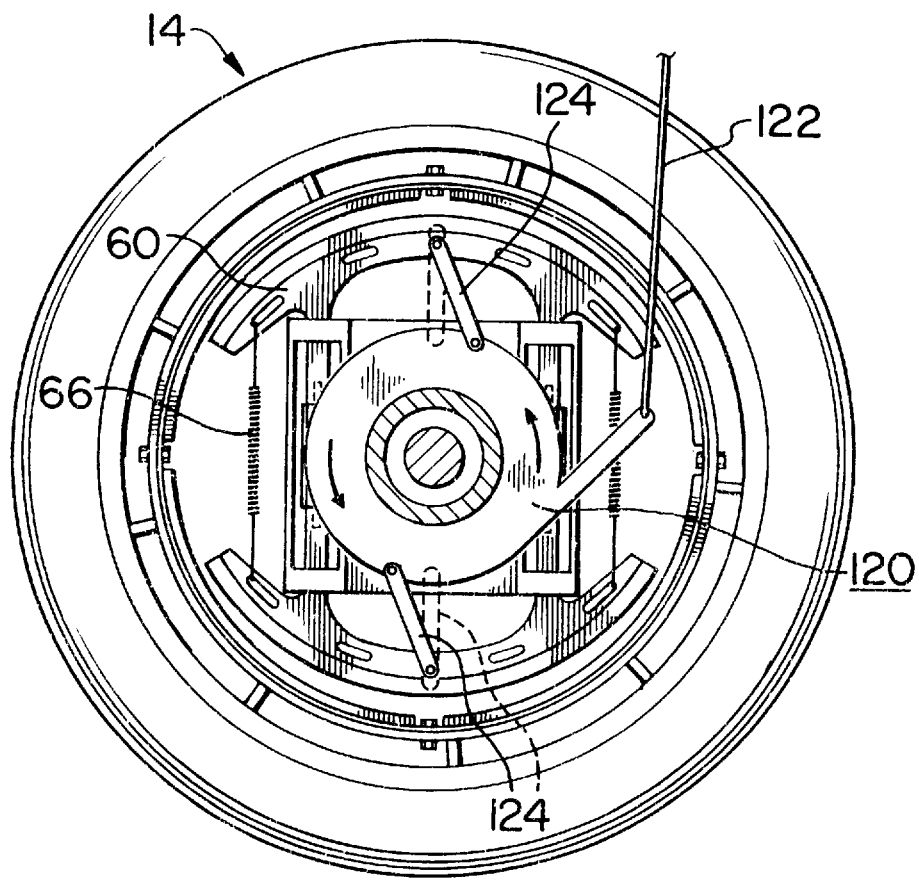
FIG. 11 is a view similar to FIG. 3 of part of a wheel and brake lining assembly forming a modification of the embodiment.

(ii) Description of FIG. 4, FIG. 5 and FIG. 11

As shown in FIGS. 4 and 5, a brake lining assembly 40 comprises a brake lining carrier in the form of a rigid cylindrical metal ring 42 having an inner cylindrical surface to which is secured a brake lining structure 41 extending partially around such surface, and having a constant radius. The brake lining structure 41 is provided by four arcuate brake linings 44, each of which subtends an angle of slightly less than 90 degrees around the common center of radius of the brake linings 44 and of the ring 42. The brake linings 44 are assembled with their radially outer peripheral surfaces engaging the inner cylindrical surface of the ring 42 and are secured by conventional rivetting or bonding techniques. Ends of the linings are slightly spaced apart, as shown, so that the lining structure does, in fact, extend substantially continuously around the inside surface of the ring 42. Between spaced apart ends of the brake linings 44, the ring 42 is provided with through holes (not shown) into which a screw-threaded means extends, e.g., attachment screws 46, to secure the brake linings assembly to an inner peripheral cylindrical surface 48 (see FIG. 3) of a support means for the brake lining structure and provided by the wheel. This support means comprises a cylindrical element 50 which is spaced radially-inwards from the wheel rim 22 while being concentric therewith. It follows, therefore, that the brake linings assembly is detachably mounted to the cylindrical element support means 50 by the angularly spaced apart screws 46 which pass through the holes in the ring 42 and are received within screw-threaded holes in the support. Alternatively, they may extend through the cylindrical element 50 as shown in FIG. 5 to be secured in place by attachment nuts 52. Hence, the wheel structure 20 differs from conventional structures in that it has the brake linings assembly 40 attached directly thereto, and this brake linings assembly 40 may be removed from the wheel for replacement purposes if desired.

As it is expected that the cylindrical element support means 50 will be caused to absorb heat during brake usage, and particularly if it is used upon the racing car, it is desirable to provide some means for assisting in heat removal. For this purpose, a plurality of radially-extending heat removal fins 54 may be provided, which may be of spiral configuration, to assist in cooling air flow. These fins 54 are spaced apart angularly around the rotational axis and are welded both to the cylindrical element 50 and to the wheel rim 22 for heat removal. Circulation of air around and between the fins 54 is effective in removing heat from the cylindrical element 50 during usage. To assist in air circulation between the fins 54, outer regions of the wheel disc 26 are provided with a plurality of apertures 156 therethrough. The inner region of the wheel disc has an open internal face 155. Thus, cooling air passes between the fins 54 and through the openings 155,156, i.e., from side to side of the wheel in the direction of the arrows 158 (see FIG. 11).

Figure 8:
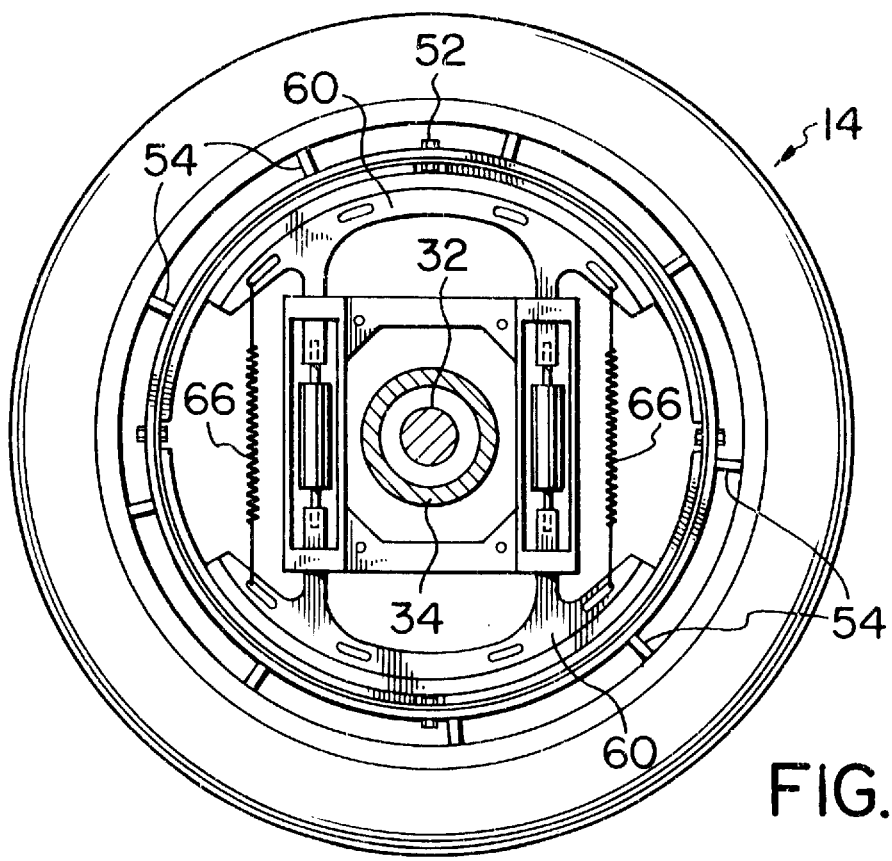
FIG. 8 is a side elevational view, partly in cross-section, and to a greatly enlarged scale, of a device for drawing pressurized fluid from the fluid brake system used in the embodiment.
Figure 9:
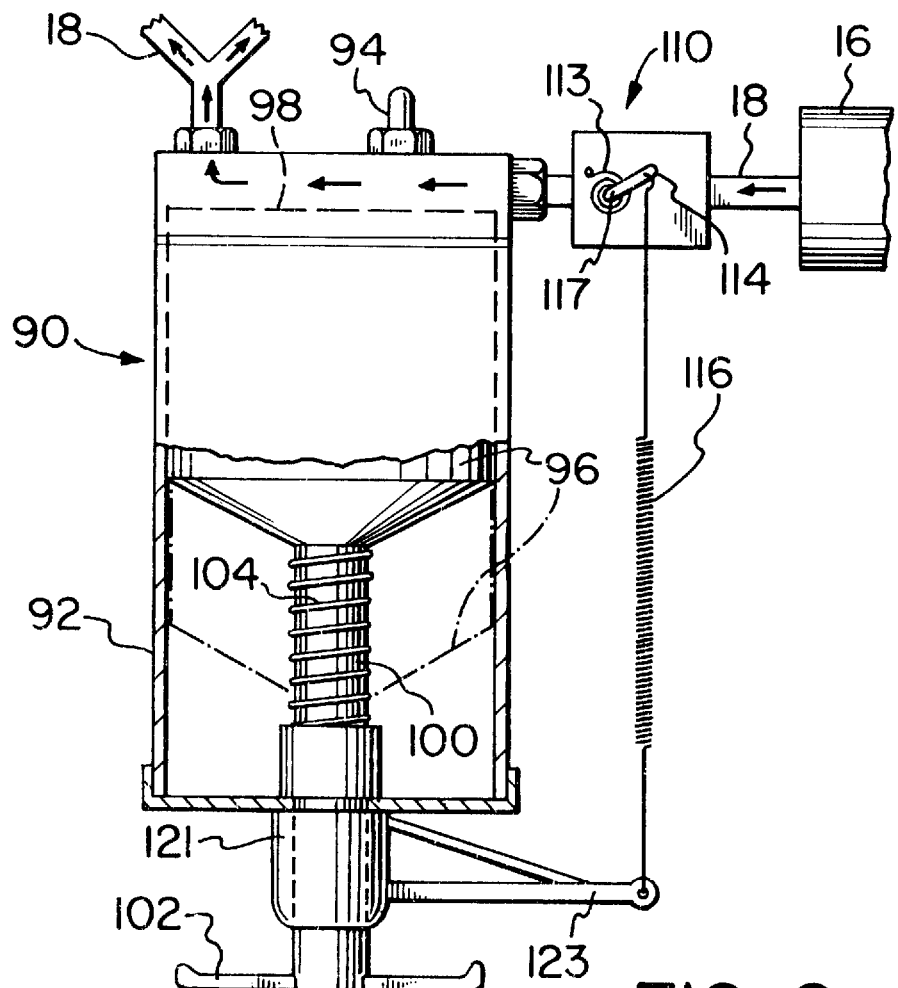
FIG. 9 is an enlarged cross-sectional side elevational view of a valve mechanism incorporated in the device of FIG. 8.

(iv) Description of FIG. 8 and FIG. 9

In order to minimize any problems associated with removal of a wheel 20 from the vehicle 10 in the embodiment as shown, the vehicle 10 also is provided with means for drawing pressurized fluid from the braking system when the brake shoes 60 are in their inactive, i.e. non-braking, positions. This enables the resilient springs 66, to move the brake shoes 60 to further positions which are further radially-inwards of their inactive positions. Such positions are shown by the chain-dotted positions for the surfaces 64 of the brake shoes 60, these chain-dotted positions being slightly inwardly of the normal inactive positions shown in full outline in FIG. 2. This means for drawing the pressurized fluid from the system comprises a piston and cylinder arrangement 90 (see FIG. 8) which is disposed in a position in the pressurized line 18 which is adjacent to the master cylinder 16 as shown by FIGS. 1 and 8. The piston and cylinder assembly 90 comprises a cylinder 92 which is open at one end onto the line 18 and which is provided with a bleed valve 94. The cylinder 92 contains a piston 96 having one end 98 forming one side of the line 18 at the position of the piston 96. At the other end, the piston 96 is attached to a coaxial operating rod 100 which extends through the housing of the cylinder 92 and is connected to an operating handle 102. The piston 96 is normally biased into the position shown in FIG. 8 with its one end 98 defining one side of the line 18, by means of a compression spring 104 which encircles the rod 100 to urge the piston 96 in the required direction.

To ensure that no damage can result to the master cylinder 16 during operation of the piston and cylinder arrangement 90, a valve arrangement 110 is positioned in the line 18 between the master cylinder 16 and the piston and cylinder arrangement 90. As shown in FIGS. 8 and 9, this valve arrangement 110 comprises a butterfly valve 112 which is normally in the chain-dotted open position in FIG. 9 to enable the master cylinder 16 to operate the braking system. This butterfly valve 112 is held in its normal open position by a torsion spring 113 (see FIG. 8) which acts as an outside link 114 to move the butterfly valve 112 counterclockwise about its pivot. At the pivot, the outside link 114 is secured to a rotatable pin 117 in the valve housing 119, the butterfly valve 112 also being secured to the pin 117. Because of road dirt, spring 116 is preferably protected by a dirt cover plate (not shown). In this position, the butterfly valve 112 engages seals 118 which are provided around the inner surface of a valve chamber 119 within which the butterfly valve 112 is accommodated. The butterfly valve 112 moves into its closed position immediately when the piston 96 commences to move towards its downward position (shown in chain-dotted in FIG. 8), whereby the master cylinder 16 becomes separated from the rest of the braking system so that fluid cannot be drawn from the master cylinder 16. Upon return of the piston 96 to its upper position shown in FIG. 8, the butterfly valve 112 is reopened.

As an alternative to the means of operation of the piston 96 described in the embodiment, the piston may be moved electrically by operation of a switch (not shown).

Figure 10:
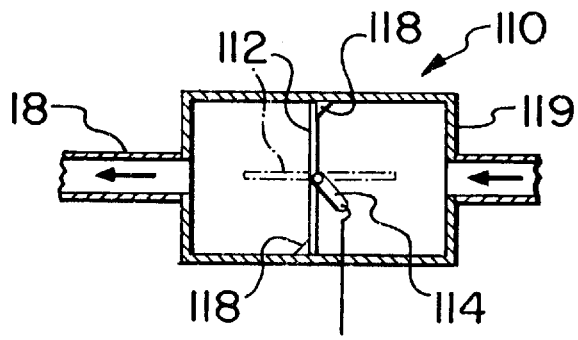
FIG. 10 is a view similar to FIG. 2 and showing a parking brake arrangement which is incorporated into a wheel assembly of the embodiment.

(iv) Description of FIG. 10

In addition, the vehicle 10 of the embodiment described herein has an emergency brake provided and which is operable at each wheel assembly. As shown by FIG. 10, this brake conveniently may comprise a disc 120 which is freely rotatably mounted around the axis of rotation of the wheel, the disc 120 being attached at one radial position to an operating cable 122. The disc 120 is operably connected to each brake shoe 60 by an operating link 124 which is pivoted at its two respective ends to the brake shoe 60 and to the disc 120. As shown in FIG. 10, with the brake not operated, the links 124 lie in the full outline position with the brake shoes in their inactive positions.

(iv) Description of FIG. 11

The four brake linings 44 need not be attached to the ring 42, but as shown in the modification of FIG. 11, may be rivetted directly to the cylindrical element 50 of the wheel.

OPERATION OF PREFERRED EMBODIMENTS OF THE INVENTION (i) Operation of the Combined Wheel and Braking System In use of the vehicle 10 and with each of the wheel and braking assemblies 12,14 rotating, normally the brake shoes 60 are spaced away from the inner peripheral surface 65 of the brake linings structure 41 as shown in full outline in FIG. 2. However, should it be required to apply braking pressure to the wheel and braking assemblies 12,14, then the master cylinder 18 is operated in conventional fashion and this increases the fluid pressure in each of the cylinders 62 to force each of the brake shoe 60 radially-outwards to their positions shown in FIG. 7, in which they perform a braking action by pressurized engagement against the inner peripheral surfaces of the brake lining structure 41.

If it is required to remove the wheel 20 for tire replacement or repair, this is quickly done by removal of the wheel retaining nuts and the wheel 20 is withdrawn. As will be noticed, this wheel withdrawal also removes the brake lining assembly 40 from the vehicle. Should the brake linings structure be worn at this time, a replacement wheel 20 with a mounted tire may be used as a replacement, the new wheel 20 having a new and unworn brake lining assembly mounted to it. Hence the tire and the brake linings may be changed simultaneously. This operation in the case of a racing car, particularly, saves valuable time during a pit stop while maintaining the vehicle in first class racing condition.

(ii) Operation of the Means for Driving Pressurized Fluid From the Braking System Operation of the piston 96 is manual by pulling the handle 102 out from the cylinder 92 which urges the piston 96 downwards as shown by FIG. 8, thereby enlarging a chamber within the cylinder at one side of the line 18. In the furthest possible position of the piston 96, it occupies the chain-dotted outline as shown in FIG. 8. As the chamber within the cylinder becomes enlarged, fluid within the line 18 is drawn into such enlarging chamber. This has the effect of reducing the resistance of the fluid in the braking system, whereby the springs 66 urge the brake shoes 60 closer together and into, or towards, the chain-dotted positions discussed above and shown in FIG. 2. As will be realized, with the brake shoes 60 in these further inner positions, the distance between the brake shoes 60 and the brake lining structure 41 is increased, thereby easing removal of the wheel 20 from the vehicle 10. Wheel removal and replacement may, therefore, be performed in a faster time than is normally possible.

The butterfly valve 112 is closed as the handle 102 commences to move out from the cylinder 92 to draw fluid from the line 18. This closure of the butterfly valve 112 is performed by a tension spring 116 which connects the free end of the link 114 to an arm 123 which extends radially-outwardly from a nut member 121. The nut member 121 is non-rotatably held (by means not shown) in screw threaded reception upon the lower end of the operating rod 100 which has a screw thread (not shown) for the purpose. The tension spring 116 is infinitely stronger than the torsion spring 113. Immediately the handle 102 commences to move downwards in FIG. 8, the tension spring 116 (which is slightly relaxed in the upper position of the handle 102) overcomes the torsion spring 113 to pivot the link 114, pin 117 and butterfly valve 112 clockwise to move the butterfly valve 112 to the closed full outline position shown in FIG. 9. In this position, the butterfly valve 112 engages seals 118 which are provided around the inner surface of valve chamber 119 within which the butterfly valve 112 is accommodated. The master cylinder 18 thus becomes separated from the rest of the braking system immediately the handle 112 starts to move downwards in FIG. 8 so that fluid cannot be drawn from the master cylinder 18.

Downward movement of the rod 100 and the handle 102 also draws the nut member 121 down. When the handle 102 reaches its lower position, and in order to hold the piston in its lower position and retain the brake fluid in the cylinder 92, the handle 102 is then turned to rotate the rod 100 in the nut, so that the handle 102 engages a stationary holding means (not shown) to hold the handle 102 in the down position. When it is required to dispel brake fluid from the cylinder 92, the handle 102 is rotated to disengage it from its holding means and is then forced upwards, thereby pushing the piston to its upper position in FIG. 8. Immediately before the end of this movement, the tension spring 116 slackens to enable the torsion spring 113 to return the valve into the chain-dotted open position shown in FIG. 9.

To operate the emergency brake, the cable 122 is pulled to rotate the disc 120 counterclockwise as shown by the arrows in FIG. 10 until the links 124 approach the chain-dotted positions sufficiently to move the brake shoes 60 radially-outwards to apply sufficient braking pressure to the surfaces of the brake linings 44.

Further, the emergency brake may be used to some effect, instead of the piston and cylinder arrangement 90 in FIGS. 8 and 9, for the purpose of reducing the fluid pressure within the braking system so as to enable the brake shoes to be moved further radially-inwards by the tension springs 66. This operation may be effected by relaxing the cable 122 so that the disc 120 is caused to move clockwise under the pressure of springs 66 from the inactive position shown by the full outline in FIG. 10, thereby drawing the brake shoes from their inactive positions to further inward positions.

The construction of the embodiment shown may be incorporated either into a conventional automotive vehicle or a racing vehicle. In the case of a conventional automotive vehicle, it may be prudent to incorporate an electrical switch (not shown) in the ignition system which operates dependent upon the position of the piston 96. Thus, this switch would enable the vehicle to be started with an ignition key only when the piston 96 is in its upper position shown in FIG. 8, i.e. with the brake shoes 60 in the full outline position shown in FIG. 2. However, with the piston 96 moved downwardly from its upper position shown in FIG. 8, and with at least some of the pressure removed from the braking system, the switch would be automatically opened and this will prevent starting of the engine of the vehicle 10 upon operation of the ignition switch. The vehicle 10 thus cannot be operated with the pressure reduced within the brake line by use of the piston and cylinder arrangement 90.

CONCLUSION

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:
1. A braking system for an automotive vehicle comprising, in combination:
   A) a wheel comprising:
      (i) a generally-cylindrical wheel rim for mounting a tire thereon;
      (ii) a wheel disc carrying said wheel rim and extending radially-inwardly from said generally-cylindrical wheel rim towards a rotational axis of said wheel for mounting said wheel upon a rotatably-driven, or free-wheeling rotatable wheel support of said automotive vehicle;
      (iii) a cylindrical support which is secured to said wheel disc and which is disposed radially-inwardly of said generally-cylindrical wheel rim; and
      (iv) a plurality of radially-inwardly facing brake lining structures, said brake lining structures being secured to said cylindrical support, said brake lining structures extending at least partially around, and having a center of radius which are coincident with, said rotational axis of said wheel;
   B) a) a rotatably-driven or free-wheeling wheel support which is secured to a non-rotational part of said vehicle along said rotational axis of said wheel;
      (b) a plurality of brake shoes, each said brake shoe having radially-opposed outer curved surfaces, said brake shoes being mounted upon said non-rotatable part of said vehicle in spaced positions around said rotational axis of said wheel support, said plurality of brake shoes comprising a pair of diametrically-opposed brake shoes, each said brake shoe being operatively connected to a fluid-operated cylinder mechanism for moving said brake shoes in a braking action; and
      (c) a pressurized-fluid operating system for moving said brake shoes in a braking action radially-outwardly from inactive positions towards, and frictionally-engaging, said radially-inwardly-facing brake lining structures, and for returning said brake shoes radially-inwardly upon termination of said braking action, said pressurized-fluid operating system including primary additional structure for effecting movement of said brake shoes to further inactive positions, said primary additional structure further including secondary additional structure for drawing pressurized-fluid from said braking system, and a master cylinder and a valve which has a normally-open position and a closed position, said valve being disposed between said master cylinder and said secondary additional structure so as to disconnect said pressurized-fluid in said master cylinder from the remainder of said system during operation of said secondary additional structure for drawing said pressurized-fluid from said braking system;
whereby, on braking action, said radially-opposing outer surfaces of said brake shoes are moved towards, and frictionally engage, said radially-inwardly facing brake lining structures which are secured to said wheel.

2. The braking system according to claim 1, wherein said operating system for moving said brake shoes on a braking action includes: a structure both for applying fluid pressure to move said brake shoes on said braking action and for relaxing said fluid pressure upon termination of said braking action.

3. The braking system according to claim 2, wherein: said secondary additional structure for drawing pressurized-fluid from said braking system includes a piston and cylinder assembly having a piston within a cylinder, one end of said cylinder being connected to said braking system; wherein movement of said piston in one direction within said cylinder draws pressurized-fluid from said braking system into said cylinder.

4. The braking system according to claim 1, wherein: said valve is held in its normally-open position by a torsion spring, said valve being urged towards its closed position by a counterbalancing tension spring, said counterbalancing tension spring being operated by vertical movement of an operating rod coupled to said piston.

5. The vehicle braking system of claim 1 wherein, in said wheel, said cylindrical support comprises a radially-inwardly facing surface extending substantially-continuously around said rotational axis of the wheel.

6. The vehicle braking system of claim 5 wherein, in said wheel, said brake lining structures are rigidly secured to said cylindrical support.

7. The vehicle braking system of claim 1 wherein, in said wheel, said brake lining structures are secured to a brake lining carrier, said brake lining carrier being detachably, but securely, mounted on said cylindrical support, with said brake lining structures facing radially-inwardly towards said rotational axis of said wheel.

8. The vehicle braking system of claim 7 wherein, in said wheel, said cylindrical support comprises: a radially-inwardly directed support surface to which said brake lining carrier is secured; wherein said brake lining carrier has an outer circumferential surface which is complementary to said support surface; and including securing members for securing said brake lining carrier to said support surface.

9. The vehicle braking system of claim 8 wherein, in said wheel, said securing members comprise a plurality of screws which are spaced apart angularly around said rotational axis of said wheel and which extend radially through respective aligned holes in said brake lining carrier and in said cylindrical support.

10. The vehicle braking system of claim 8 wherein, in said wheel, said cylindrical support surface and said circumferential surface are each cylindrical and are complementary to one another.

11. The vehicle braking system of claim 10 wherein, in said wheel, said cylindrical support comprises a cylindrical element which is spaced radially-inwardly of, and which is concentric with, said generally-cylindrical wheel rim; and including heat-dissipation members for the dissipation of heat which is caused by friction which is generated by braking action.

12. The vehicle braking system of claim 11 wherein, in said wheel, said heat dissipating members comprise heat removal fins extending from said cylindrical support into a hollow annular chamber which is spaced radially-inwardly from said wheel rim.

13. The vehicle braking system of claim 11 wherein, in said wheel, said heat removal fins are spiral in configuration.

14. The vehicle braking system of claim 12, wherein, in said wheel, said annular chamber has apertures which communicate between front faces and rear faces thereof, for the passage of cooling air therethrough.

15. An emergency braking system for an automotive vehicle comprising, in combination:

A) a wheel comprising:
  (i) a generally-cylindrical wheel rim for mounting a tire thereon;
  (ii) a wheel disc carrying said wheel rim and extending radially-inwardly from said generally-cylindrical wheel rim towards a rotational axis of said wheel for mounting said wheel upon a rotatably-driven, or free-wheeling rotatable wheel support of said automotive vehicle;
  (iii) a cylindrical support which is secured to said wheel disc and which is disposed radially-inwardly of said generally-cylindrical wheel rim; and
  (iv) a pair of diametrically-opposed, radially-inwardly facing brake lining structures, said brake lining structures being secured to said cylindrical support, said brake lining structures extending at least partially around, and having a center of radius which is coincident with, said rotational axis of said wheel; and B)
  (a) a rotatably-driven or free-wheeling wheel support which is secured to a non-rotational part of said vehicle along said rotational axis of said wheel;
  (b) a pair of diametrically-opposed brake shoes, each said brake shoe having radially-opposed outer curved arcuate surfaces, said brake shoes being mounted upon said non-rotatable part of said vehicle in spaced positions around said rotational axis of said wheel support, respective ends of said arcuate brake shoes being secured to one another by means of tension springs; and
  (c) a pressurized-fluid operating system for moving said brake shoes in a braking action radially-outwardly from inactive positions towards, and frictionally-engaging, said radially-inwardly-facing brake lining structures, and for returning said brake shoes radially-inwardly upon termination of said braking action, said pressurized-fluid operating system including primary additional structure for effecting movement of said brake shoes to further inactive positions, said primary additional structure further including secondary additional structure for drawing pressurized-fluid from said braking system, for moving said brake shoes to said further inactive position, said operating system further comprising: a disc which is rotatably-attached to said wheel support, said disc including a pair of diametrically-opposed links, each said link being secured to an associated one of said brake shoes, said disc also including an operating finger which is connected to an operating cable;

whereby, on operating said operating cable to rotate said disc in a counterclockwise direction, said radially-opposing outer curved surfaces of said brake shoes are moved towards, and frictionally engage, said radially-inwardly facing brake linings which are secured to said wheel.

* * * * *